March 29, 1966  J. L. BOTKIN  3,242,739
SAMPLING VALVE
Filed Jan. 9, 1963
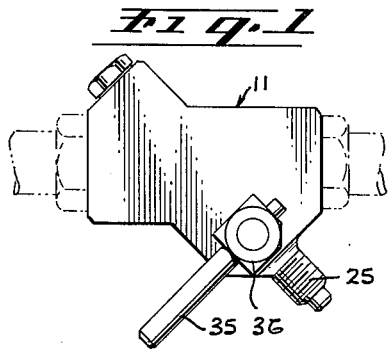
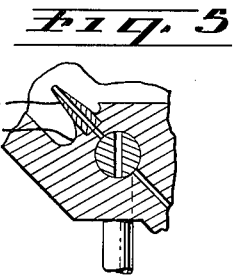
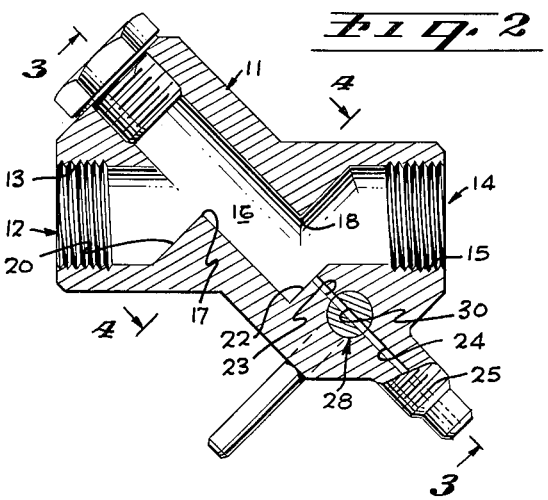
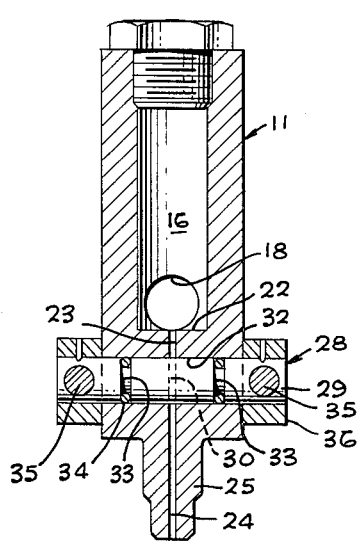
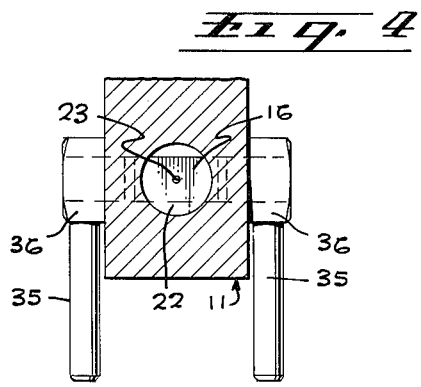
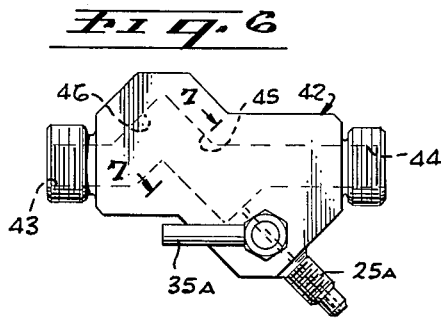
INVENTOR.
JOSEPH L. BOTKIN
BY
Mason & Graham
ATTORNEYS

United States Patent Office 3,242,739
Patented Mar. 29, 1966

3,242,739
SAMPLING VALVE
Joseph L. Botkin, 7957 Capistrana Ave.,
Canoga Park, Calif.
Filed Jan. 9, 1963, Ser. No. 250,329
5 Claims. (Cl. 73—422)

This invention has to do with means for obtaining samples of fluid from hydraulic systems and the like.

In recent years with the development of aero-space systems and the like and the attendant complex fluid systems requiring particle-free liquids, old methods of sampling fluids at random have become obsolete as ineffective to give a true sample of contaminating particles entrained in the fluid. Consequently, various methods were developed to take samples based on so-called isokinetic sampling theory. This involved using a probe which projected into midstream of an oncoming fluid and which procured a sample from this laminar flowing fluid. While this method worked well for some installations, it still did not provide the accuracy required for highly developed systems where particle-free liquids are a necessity.

Isokinetic sampling theory demanded that the flow velocity in the probe be the same as that of the main stream because of the tendency of the large and heavy particles to deflect less than small, lightweight particles. However, as a practical matter it is very difficult, if not impossible, to move the fluid through the probe at the same speed as the main body of fluid in a tube and thus the matching of the probe and main stream flow velocity has proved to be impractical. Also efforts were made to produce a turbulent flow by introducing a baffle in the path of the fluid upstream from the probe. However, while this gave improved results, the end results were not completely satisfactory.

An object of the present invention is to provide a novel and effective method of sampling a fluid, such as hydraulic fluid, as it travels through a pipeline or tube which creates turbulence in the fluid by causing it to take a tortuous path and which creates a low velocity random swirling area containing the turbulent flow mixed fluid from which a sample is taken.

A further object is to provide a means of procuring a more valid or representative sample both in the continuous and intermittent flow-type systems than has heretofore been possible with other methods by creating substantially the same turbulence in the sampling region under various flow conditions.

More particularly it is an object to provide a fitting or sampling valve of novel internal configuration whereby the fluid flowing therethrough is induced to become turbulent and wherein there is created a region of low velocity random swirling condition, and to provide novel means for withdrawing fluid from this latter region.

These and other objects will apparent from the drawing and the following description. Referring to the drawing:

FIG. 1 is a side elevational view of a valve embodying the invention;

FIG. 2 is a central longitudinal sectional view through the valve of FIG. 1, but on a larger scale;

FIG. 3 is a sectional view on line 3—3 of FIG. 2;

FIG. 4 is a cross-sectional view on line 4—4 of FIG. 2;

FIG. 5 is a fragmentary sectional view in the same plane as FIG. 3 but showing a modified form of the invention;

FIG. 6 is a view similar to FIG. 2 of a modification; and

FIG. 7 is a fragmentary cross-section on line 7—7 of FIG. 6.

More particularly describing the invention, numeral 11 generally designates the body of the device and this may be made of metal or plastics, depending upon the environment in which it is to be used, and may be fabricated by any conventional method. The body 11 of FIGS. 1–5 appears as it would if machined from metal stock.

The body includes an inlet port 12 having internal screw threads 13 and an outlet port 14 having internal screw threads 15. Between the ports is an elongated central chamber or passage, designated 16, which connects with the inlet port through an opening 17 and with the outlet port through an opening 18. This chamber or passage is disposed at an angle of about 45° with respect to the common axis of the two ports. Consequently, the direction of the fluid passing through the fitting is changed in passing from the inlet to the outlet and in this connection it will be noted that beyond the inlet port is an inclined face 20 which initially deflects a portion of the fluid stream into the passage 16 creating considerable turbulence with minimum resistance to flow.

At the outlet end of the passage 16 is what may be called a dead end wall 22, the opening 18 to the outlet port being disposed laterally of the passage 16. It will be appreciated that in the region directly adjacent this wall or face 22 the flow of fluid is necessarily at a low velocity and in a random swirling condition as the main stream of fluid moves through opening 18 to the outlet port 14. Face 22 is provided with a sampling orifice 23 which may be of any desired size, and this continues as a passage 24 to the exterior of the fitting through an externally threaded nipple 25.

The passage 24 is controlled by a valve 28 having a cylindrical body 29 with an opening 30 therethrough adapted to register with the passage 24 in the body when properly oriented for that purpose. The valve member is rotatable in a cylindrical bore 32 provided in the body of the device. Two grooves 33 are provided in the valve member for the reception of seal rings 34. Handles 35 and collars 36 are provided on the ends of the valve member.

It will be seen that fluid flowing through the fitting will become turbulent in the passage or chamber 16 as previously pointed out and that, since the face or end wall 22 is in effect a dead end of the passage 16, the flow immediately adjacent this face is at a low velocity and may be characterized as in a random swirling condition, making this region ideally suited for taking a sample.

If desired the sampling orifice can be moved somewhat forward of the face 22 into the chamber 16 by providing an orifice tip or tube 38, as shown in FIG. 5. Also, if desired, this face can be made with an annular concave area, designated 40 to produce additional turbulence.

In the form of the invention shown in FIGS. 1–5, the inlet and outlet and the intermediate passage 16 are generally circular in cross section. However, this is not essential and if the body of the fitting is molded or cast, these passages may be square in cross section, or of other desired shape. Thus, in FIGS. 6 and 7 I show a sampling valve having a molded or cast body 42 provided with an inlet port 43 and an outlet port 44, the ports being coaxial. Inlet port 43 leads to an intermediate passage or chamber 45 which in turn communicates with the outlet port 44. The chamber 45 is of rectangular cross section while the ports may be cylindrical or rectangular. The lateral section 46 is also rectangular in cross section. The remainder of the valve is substantially the same as the one previously described and the other parts have the same reference numerals except for the addition of the letter A. This fitting or valve also operates in the same manner as the one previously disclosed.

Although I have shown and described preferred forms of my invention, I contemplate that various changes and modifications can be made therein without departing from the invention, the scope of which is indicated by the following claims. By way of example, the sampling valve of FIGS. 1–4 may be provided with externally threaded ends in place of those shown, and, similarly the sampling valve of FIGS. 6 and 7 may be provided with internally threaded ends in place of those shown. Also, while I show a rotary valve member 28 of a particular type fitted with seal rings, I contemplate that other types of valve elements may be used, such as a grooved rotary type, or an axially movable element. Also, while the seal rings 34 are desirable, they need not be O-rings as shown, and, in fact may be omitted altogether if the parts are very closely fitted.

I claim:
1. A sampling fitting, comprising a body having an inlet, an outlet, and a fluid passage connecting the inlet and outlet, said body providing a sampling face disposed directly in the path of fluid flow through a portion of said passage and acting as a barrier against further flow of fluid in the direction thereof, said body having a sampling orifice in and flush with said sampling face and a sample passage leading from the orifice to the exterior of the body said fluid passage having a configuration such as to prevent direct-in-line flow of fluid from said inlet to said sampling face.

2. The sampling fitting set forth in claim 1 in which a valve is provided in the body controlling said sample passage.

3. The sampling fitting set forth in claim 1 in which said outlet and inlet are in axial alignment, in which said fluid passage therebetween includes a section extending angularly transverse to the axis of said inlet and outlet and in which said sampling face forms a wall at the outlet end of said section normal to the axis of said section.

4. A sampling valve, comprising a body having an inlet port and an outlet port in axial alignment, and having a fluid passage connecting said ports including diagonal section extending angularly transverse of the axis thereof, said body providing a sampling face disposed at the outlet end of said diagonal section of said fluid passage and forming an end wall thereof, said body having a sampling orifice in said sampling face and a sample passage leading from the orifice to the exterior of the body, and a valve in said body controlling said sample passage.

5. The valve set forth in claim 4 in which said sampling orifice is defined by a tube projecting from the sampling face longitudinally of the diagonal section and in which said sampling face is characterized by an annular concave section concentric with the tube.

References Cited by the Examiner

UNITED STATES PATENTS

| 2,012,836 | 8/1935 | Talbot et al. | 73—422 |
| 2,226,097 | 12/1940 | Happel et al. | 73—422 X |
| 2,320,544 | 6/1943 | Gaus et al. | 73—421 X |

RICHARD C. QUEISER, *Primary Examiner.*

JOSEPH P. STRIZAK, *Examiner.*

JERRY W. MYRACLE, *Assistant Examiner.*